United States Patent Office 3,723,301
Patented Mar. 27, 1973

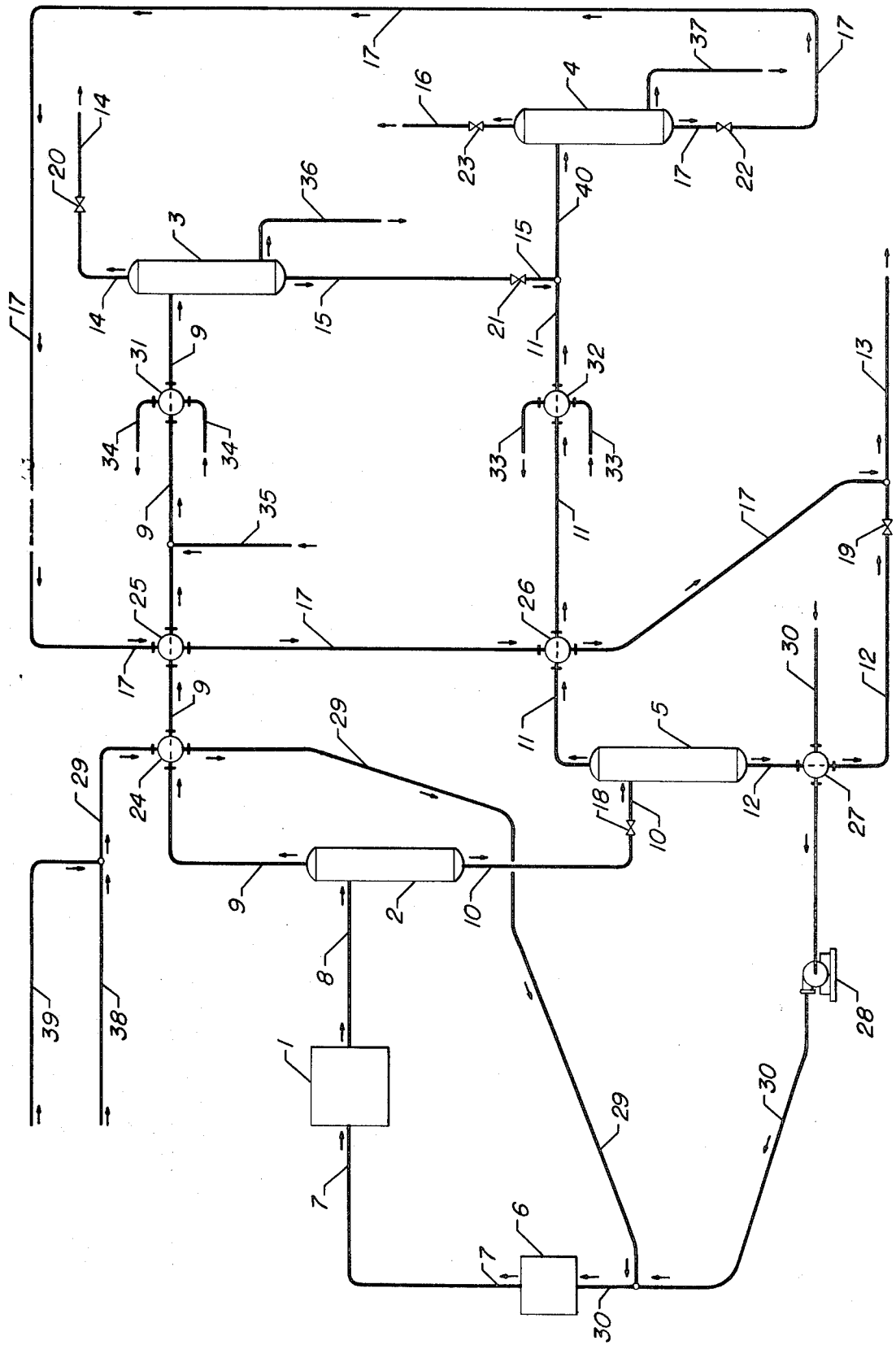

3,723,301
PROCESS FOR THE RECOVERY OF HEAT FROM HYDROCARBONS AND THE SEPARATION THEREOF
Lynn H. Rice, Des Plaines, Ill., assignor to Universal Oil Products Company, Des Plaines, Ill.
Filed Dec. 1, 1971, Ser. No. 203,794
Int. Cl. C10g 23/00
U.S. Cl. 208—213          14 Claims

ABSTRACT OF THE DISCLOSURE

A process flow scheme is disclosed in which a high temperature and high pressure effluent stream is separated into various valuable hydrocarbon fractions. Heat is also recovered from the hydrocarbon effluent. The disclosure contemplates the use of hydrocarbon processes which produce hydrocarbon effluent materials of 400 p.s.i.g. or higher pressure and having at least 500° F. temperatures. The hydrocarbon effluent is flashed in various low pressure flash zones and passed through heat exchangers in order to separate various hydrocarbon components from the effluent while recovering heat from the effluent for improved process efficiencies.

BACKGROUND OF THE INVENTION

Field of the invention

The field of art to which this invention pertains is hydrocarbon separation and heat exchange. Specifically, the invention relates to a process in which hydrocarbon effluents are separated with various separated portions passing through heat exchangers for recovery of heat therefrom. In general, the invention can be utilized in the hydrocarbon processing or petrochemical industries.

Prior art

The prior art which is relevant to this invention is generally considered to be those processes in which high temperature hydrocarbon effluent streams under high pressure are separated into various boiling fractions with the recoverey of heat from the hydrocarbon effluent to produce reasonable process efficiencies. The reuse of heat from hydrocarbon effluents is well known in the hydrocarbon processing field and is utilized to reduce substantially utilities or fuel consumption in heating up streams which could otherwise be heated up using in-process heat exchangers. The prior art is also abundant regarding the separation of effluent streams by flashing and high pressure techniques.

In particular, one flow scheme which the inventor is familiar with which is utilized in the hydrocarbon processing industry, and particular in hydrogenation of heavy vacuum gas oils, is that scheme in which the makeup gas and a vacuum gas oil charge are passed through fresh feed and effluent heat exchanger in which effluent material which leaves a reaction zone at a high temperature and pressure is heat exchanged with the vacuum gas oil and hydrogen to heat up the feed stock. The feed stock is then passed into a charge heater if utilized and thereafter passed into hydrogenation reaction zone which is operated at conditions and with a catalyst to effect the hydrogenation of sulfur and nitrogen compounds in the feed. The effluent material from the reactor then passed into the feed-effluent heat exchanger to be cooled by exchange with the fresh feed stock previously mentioned. This feed-effluent heat exchanger requires that high temperature and high pressure metallurgy techniques be utilized since the effluent material which leaves the reactor is at least at a pressure above about 700 p.s.i.g. with the effluent temperature being above about 750° F. These high temperatures and high pressures present problems in design consideration and in the selection of construction materials to be utilized.

The feed which then is relatively cool can pass into another heat exchanger to further cool the effluent material and then be passed into a high pressure cold separator which is operated around 100° F. to allow light gases such as hydrogen sulfide, hydrogen, methane, ethane, and propane to be removed from the remaining liquid material. The liquid material removed from the cold high pressure separator is still at a relatively high pressure (generally around 1,000 p.s.i.g.) and passes into a cold flash zone in which a reduction in pressure is utilized to flash off hydrocarbons having from one to about five carbon atoms per molecule as vapor materials which can be recovered. The heavier liquid feed materials can be passed into a fractionation zone and fractionated into more valuable components. Typically, the light gases removed from the cold high pressure separator are passed to a sulfur and/or ammonia removal system with the remaining hydrogen rich gas recycled to the reactor along with a certain quantity of makeup gas, generally hydrogen.

As I have explained, the primary problems with this type of a system are the high pressure and high temperatures which are dealt with in the feed-effluent heat exchanger. This system also has been found to be quite high in utilities consumption because of the fact that the liquid removed from the cold flash separator which must be passed through a fractionator must be reheated through the use of another heat exchanger. The fuel needed to supply the heat to increase the feed passed to the stripper fractionator is the primary added cost of operation in this flow scheme.

The flow scheme claimed differs substantially from the flow scheme described above and from most other flow schemes utilized in similar type operations. The specific advantages which are realized for the use of my flow scheme are the fact that the feed-effluent heat exchanger must only be subject to relatively high temperatures and not high pressures, as is observed from the prior art flow scheme. Additionally, by the selective location of heat exchangers the utilities consumption in the fractionation zone are considerably reduced since the liquid feed which passes into the fractionator is at a temperature substantially higher than the liquid removed from the cold flash separator mentioned above. In short, the fractionated feed material does not have to be cooled down at temperatures below about 150° F. which consequently means it does not have to be heated up when passes to the fractionator which offers a savings in utilities.

Another advantage offered by the flow scheme of my invention is that in instances in which the heat exchanger is required to contact high temperature, high pressure materials for exchange, the exchanger itself is quite small and does not present substantial problems in design consideration. The only instances in which heat exchangers are utilized in which high pressure and high temperature streams both contact one or both sides of the heat exchanger are on streams to which the high pressure material is a gas or vapor and in which the mass throughput through the exchanger is relatively low as compared to the feed effluent exchanger which allows it to be designed as a smaller physical facility.

SUMMARY OF THE INVENTION

The basic invention can be described as a process in which a high temperature and a high pressure hydrocarbon effluent stream from a hydrocarbon conversion process passes into a high pressure separation zone and continues to separate the effluent into a liquid and vapor material. The liquid material from the hot high pressure separation zone is passed into a hot flash drum at a reduced pressure to flash off light vaporous hydrocarbons while leaving heavy materials which are suitable for fractionation. The vapor stream from the hot high pressure separator is cooled and then passed into a cold high pressure separator where the material is then separated into a liquid material and light gases. The liquid material is combined with the vapor material from the hot flashdrum passed into a cold flash separation zone which causes the fuel gases to be separated from the liquid materials. The liquid materials from the cold flash separation zone are heated up and combined with the cooled liquid stream from the hot flash zone and passed into a fractionator for separation into valuable and segregated product streams.

DESCRIPTION OF THE DRAWING

The drawing illustrates the basic process of my invention. A hydrocarbon conversion zone is located within vessel 1. Vessel 2 is a hot high pressure separator, vessel 3 is a cold high pressure separator, vessel 4 is a cold flash zone, vessel 5 is a hot flash zone, and vessel 6 is a feed preheating zone. Also shown are heat exchangers 24, 25, 26, 27, 31, and 32. Flow control valve 18 controls the liquid from the hot high pressure separator which passes through line 10 into the hot flash zone and maintains a sizeable pressure drop across line 10. Valve 21 in line 15 imposes a sizeable pressure drop between vessel 3 and line 11 and controls liquid flowing through line 15. The other valves 19, 20, 22, and 23 also control fluid flow and can be controlled to maintain plant pressure in various sections of the process.

Briefly describing the process flow, makeup hydrogen from line 39 together with recycle gas from line 38 pass through line 29 under high pressure and through heat exchanger 24. The gas passing through line 29 is heated up, remains under high pressure, and comes in contact with feed stock passing through line 30 which also is at high pressure. The hydrogen and feed stock are commingled and passed through line 30 into charge heater 6 which heats up the feed stock to a predetermined preheat temperature. The preheated total feed mixture then passes through line 7 into hydrocarbon conversion zone 1 wherein the desired hydrocarbon conversion operation takes place. The effluent material from hydrocarbon conversion zone 1 passes through line 8 into th hot high pressure separator vessel 2. The temperature and pressure of the material within the hot high pressure separator is essentially that of the effluent material passing through line 8.

The hot high pressure separator effects the separation of vapors from liquids. The hot high pressure separator vapors pass through line 9 and contact heat exchanger 24 to be cooled by the cool hydrogen gas passing through line 29. The hot high pressure separator vapors continue on through line 29 into heat exchanger 25 which effects a further cooling of the vapor material, and the heating of materials passing through line 17. The cooled hot high pressure separator vapor continues passing through line 9 at essentially the effluent pressure and passes into heat exchanger 31 for additional cooling and then passes into cold high pressure separator 3. The cold high pressure separator 3 is substantially cooler than the hot high pressure separator 2 and is generally around about less than 200° F. temperature. Because of the reduction in temperature, materials which are normally vaporous in the hot high pressure separator have now been converted into liquid material. Water is injected into line 9 at line 35. The water helps recover ammonia and hydrogen sulfide from the process. Light gases are separated from the liquid material in cold high pressure separator 3 and pass through line 14 past control valve 20 and can be used as recycle gas and passed into line 38 after removal of contaminants. Preferably line 14 is connected to a scrubbing system which can remove hydrogen sulfide and/or ammonia from this gas prior to its reuse in the process. Sour water which contains dissolved ammonia is removed via line 36.

The liquid material separated from the vapor in the cold high pressure separator 3 passes through line 15 past control valve 21 and eventually ends up commingled with material passing through line 11 and passes into line 40 and into the cold flash zone 4.

The liquid material from the hot high pressure separator 2 passes via line 10 past valve 18 which effects a substantial pressure drop across line 10 causing some of the hot material to be vaporized. The material passing through line 10 passes into the hot flash zone 5 which offers a zone in which the flashing can take place. The temperature in this zone is essentially the same as the effluent stream 8 temperature. The vapor material from the hot flash zone passes out of that zone via line 11, is cooled by being contacted with material passing through line 17 in heat exchanger 23. Further cooling of this material takes place in heat exchanger 34. The hot flash vapors have been substantially cooled and they pass into line 40 and into the cold flash zone 4. The material passing through line 40 into the cold flash zone 4 also contains cold high pressure separated liquid which passes through line 15 and is commingled with the material passing through line 11. The vapors are removed from the cold flash zone 4 via line 16, pass through valve 23 to be utilized as a fuel gas. Sour water which contains dissolved ammonia is removed via line 37.

The liquid material separated from the vapors in the cold flash zone 4 is passed via line 17 through valve 22 and eventually meets up with the material passing through line 12. These materials which pass into line 13 pass into a suitable fractionation means for separation into various valuable hydrocarbon products.

The liquid material which leaves the cold flash zone via line 17 is relatively cool since all the streams which are passed into the cold flash zone have passed through at least two heat exchangers for cooling. Therefore, in order to reduce the utilities consumed by the fractionation zone this material passing through line 17 is heated in a two stage operation by passing it through heat exchangers 25 and 26. Heat exchanger 25 causes the heating of the cold flash zone liquid passing through line 17 and the additional cooling of the hot high pressure separator vapors passing through line 9. The second stage of heating of the liquid passing through line 17 occurs in heat exchanger 26 in which the hot flash zone vapors are cooled while the material passing through line 17 is further increased in temperature.

The liquid removed from the hot flash zone 5 passes through line 12 and contacts heat exchanger 27. The liquid material passing through line 12 is extremely warm and is essentially the same temperature as the effluent material which has been removed from reaction zone 1 via line 8. Heat exchanger 27 is designed to affect the contact of relatively low pressure streams—that is streams less than about 300 p.s.i.g. Feed stock which is utilized in the process passes through line 30 and through heat exchanger 27 to be heated up substantially. The heated fluid is then pumped to a high pressure by pump 28 continuing to pass through line 30 to be commingled with hydrogen which has been heated by exchanger 24 which passes through line 29 for eventual use in conversion zone 1. In certain design considerations to prevent vapor lock of pump 28, a surge tank is located between the suction portion of pump 28 and the outlet of heat exchanger 27.

The heated hot flash zone liquid continues passing through line 12 and flows past control valve 19 which controls the amount of material leaving the hot flash zone to prevent it from being totally drained of liquid. The materials passing through line 19 and 17 are now at relatively high temperatures—somewhere around 400 or higher degrees Farenheit. They pass into line 13 and can be passed into fractionator fractionation means for separation.

The above described flow scheme is a basic process flow of my invention. It does not include the detailed components necessary to effect stable operations. Control operations which utilize flow control valve, temperature control means and various pressure control valves are not included in the overall process of this invention but they are contemplated to be utilized to employ the process of my invention in actual processing operations.

DETAILED DESCRIPTION OF THE INVENTION

A broad embodiment of this invention resides in a method for the separation of a high pressure and temperature effluent stream from a hydrocarbon conversion process into product streams and the removal of heat from said effluent, which process comprises: passing said high pressure and temperature effluent into a hot high pressure separator at hot separation conditions, including a pressure and temperature substantially the same as said effluent, to effect the separation of said effluent into a hot separator liquid and a hot separator vapor said vapor and liquid having a pressure and temperature substantially the same as said effluent; passing said hot separator liquid into a hot flash zone at conditions including a reduction in pressure to effect the separation of said hot separator liquid into a hot flash vapor and a hot flash liquid, said hot flash vapor and liquid having a temperature substantially the same as said effluent; cooling said hot flash liquid, said hot flash vapor and liquid having a temperature substantially the same as said effluent; cooling said hot flash liquid; cooling said hot flash vapor; cooling said hot separator vapor and passing said vapor to a cold high pressure separator at conditions to effect the separation of said vapor into a cold high pressure separator vapor and liquid at pressures substantially the same as the effluent pressure; recovering said cold high pressure separator vapor; reducing the pressure of the cold high pressure separator liquid and passing it together with said hot flash vapor which has been cooled into a cold flash zone at conditions to effect the separation of said cold high pressure separator liquid and said hot flash vapor into fuel gas and cold flash liquid; recovering said fuel gas; heating said cold flash liquid and commingling said liquid with said hot flash liquid which has been cooled and passing the commingled mixture to a fractionation zone to effect recovery of valuable hydrocarbon components.

The process of this invention is applicable to most all refinery and petrochemical operations which produce high temperature and pressure effluent streams from a hydrocarbon conversion zone. Specifically this invention can preferably be utilized in gas oil hydrogenation or hydrocracking processing.

In gas oil hydrogenation operations a feed stream passes into a conversion zone along with a hydrogen stream. The mixture contacts a catalyst at suitable temperatures and pressures to effect the conversion of substantially all sulfur and nitrogen compounds to hydrogen sulfide and ammonia. Mild hydrocracking also generally takes place.

In the gas oil hydrocracking operations, a heavy feed stock passes into the conversion zone with hydrogen at suitable reaction conditions to effect the hydrocracking of gas oil to lower molecular weight components and in many cases the conversion of substantial quantities of sulfur and nitrogen to hydrogen sulfide and ammonia.

Typically the hydrocarbon conversion processes of the present invention have pressures generally exceeding 500 p.s.i.g. and temperatures greater than about 700° F. Specifically in most conversion processes the pressures will exceed 1,000 p.s.i.g. and will often times be greater than 2,000 to 3,000 p.s.i.g. The temperatures, depending whether hydrogenation or hydrocracking are to take place, can vary anywhere from about 700 to 1100° F. or higher. This invention is particularly applicable to hydrocarbon effluents having temperatures greater than 900° F. and pressures higher than about 1,000 p.s.i.g.

The benefits afforded by the use of my process center around both reduction in capital outlays and utilities consumption. Specifically regarding the savings in utilities accompanying my invention, the effluent material which is removed from the hydrocarbon conversion zone is immediately separated at high temperature and pressure, which correspond to the effluent temperature and pressure, into vapor and liquid streams. The vapor stream from these typical conversion reactions is about ¼ to ⅓ the mass of the hot effluent liquid. Consequently, when the vapor is cooled the heat removed from the vapor constitutes a smaller percentage of the heat leaving the hydrocarbon conversion zone than if the entire effluent stream were cooled. The vapor stream is cooled preferably in a three stage operation and eventually passes into a cold high pressure separator which allows light gases to be removed from the liquid components derived from the cooled hot liquid vapors.

The hot effluent liquid separated from the hot effluent vapor is reduced in pressure and passed into a hot flash zone at substantially the same temperature as the effluent material. Since there is a reduction in pressure of the hot effluent liquid, some of its is vaporized. That vapor which comprises less than about 5% of the total hot effluent liquid is cooled and passed together with the liquid from the cooled high pressure separator into a cold flash zone. The cold flash zone effects the separation of its feed into fuel gases and a liquid material.

The hot liquid from the hot flash zone is still substantially the same temperature as the effluent material but is at a substantially reduced pressure. By heat exchanging this hot material with feed stock passed into the hydrocarbon conversion zone, a heat saving is attained. Additionally, the heat exchanger utilized for this operation effects heat exchange between two relatively low pressure streams and does not have to be designed for high temperature and high pressure conditions. It must only be designed for high temperature operations.

The liquid from the hot flash zone after being cooled is commingled with the cold flash zone liquid and can then be passed into a fractionation zone for suitable separation into valuable product streams.

An additional benefit afforded by the use of my invention is the fact that hot high pressure separator can be incorporated into the same vessel which contains the hydrocarbon conversion zone. This eliminates the necessity of designing a separate vessel which is required to sustain high pressure and high temperature operations.

In the prior art process, the effluent material from the hydrocarbon conversion zone is heat exchanged with the total feed which passes into the conversion zone. This heat exchange takes place at high temperature and high pressure conditions and requires extensive design considerations for safe and continued operations. The cooled effluent liquid which leaves this heat exchanger is typically reduced in temperature from about 700° F. or higher down to 300° F. or less. Additional cooling is utilized to cool the stream to roughly 100° F. after which the cooled effluent stream passes into a cold separator. In this case, essentially all of the effluent is cooled. As can be appreciated, the liquid material from the cold separator which passed into a fractionation zone must be reheated. In instances in which preheat would be utilized in lieu of additional heat input into the fractionating column itself, the fractionator feed could be heat exchanged with effluent material. However, the problem associated with this exchange involves the use of a heat exchanger which would exchange heat between the hot high pressure effluent stream and the cool low pressure fractionator feed. This requires extensive design considerations for safe and continued operations of the heat exchanger. In instances where the fractionator feed is not heated by exchange with effluent material, utilities consumption would increase because of the use of additional reboiler heat or feed preheat or both.

While the process of my invention may utilize more heat exchangers within the process flow, when these heat exchangers are required to perform they do so under conditions which do not present extensive design consideration problems. Specifically heat exchanger 27 of the drawing operates at low pressures for both streams which pass through it. This is advantageous for the reasons given above. Heat exchangers 24, 25, and 34 effect the cooling of the hot high pressure separator vapors. Since the quantity of hot high pressure separator vapors is relatively small, there is a reduction in the problems of designing these heat exchangers for high temperature and high pressure operations. Specifically in heat exchanger 24, both materials being exchanged are at high pressures with the effluent material being also at a high temperature. The relatively small quantity of hot high pressure separator vapors passing through this heat exchanger does not place too much of a burden on designing this exchanger.

Heat exchanger 24 requires the exchange between high pressure vapors passing through line 9 and low pressure and low temperature liquid passing through line 17. Since the effluent material entering exchanger 25 has been substantially cooled, the only real problem in designing this exchanger is the consideration of high and low pressure streams. Heat exchanger 31 also requires the same considerations as for exchanger 25 except that the material passing into exchanger 31 via line 9 is even cooler than the input to exchanger 25.

Exchangers 26 and 32 present little difficulty in design since they contact relatively low pressure streams and only require heat exchange from a high temperature stream to a moderate temperature stream. As can be seen in the drawing, heat exchanger 26 contacts low pressure high temperature vapors passing through line 11 with low pressure liquid passing through line 17 which has been previously heated to a modaterly high temperature in exchanger 25.

The attached drawing shows the basic flow scheme for my invention. Not shown are specific control means which can be utilized to regulate liquid levels in the various vessels, the pressures on the various vessels, the control of flow between the vessels and the extent of conversion in the reaction zone. It is felt that one skilled in the art would be able to design an operable process utilizing the basic concepts which I have claimed.

EXAMPLE

The following examples is presented to illustrate the process of this invention and should not unduly restrict or limit the scope of this invention.

The specific operations taking place in this example are hydrogenation of a charge stream which is a vacuum gas oil having an API of about 23.6°, an initial boiling point of 600° F., an end point of approximately 1050° F., a sulfur content of about 1.8 wt. percent and a nitrogen content of about 1430 p.p.m. by weight.

The hydrogenation reaction is carried out over a catalyst made up of an inorganic refractory oxide base consisting of alumina and silica with hydrogenation activator metals such as nickel and molybdenum at a space velocity of about 2.0. The desired product which passes to the fractionation means should have an API of about 27.7, an initial boiling point of about 600° F., an end point of about 1050° F., a flash point of 140° F., 0.2 wt. percent sulfur with essentially no nitrogen.

The operations take place in the conversion zone with the effluent passing to the separation flow scheme claimed. Table I below illustrates the average temperature and pressures found in the various zones and the input and output temperatures for all of the streams passing through heat exchangers.

TABLE I.—STREAM PRESSURES AND TEMPERATURES

| Zone description | Temperature, °F. | Pressure, p.s.i.g. |
|---|---|---|
| Hydrocarbon conversion Zone 1 | 780 | 1,050 |
| Hot high pressure separation Zone 2 | 780 | 1,050 |
| Cold high pressure separation Zone 3 | 100 | 1,000 |
| Cold flash Zone 4 | 130 | 100 |
| Hot flash Zone 5 | 775 | 150 |

| Heat exchangers: | | Input | Output |
|---|---|---|---|
| 24 | Line 9 | 780 | 460 |
|  | Line 29 | 150 | 680 |
| 25 | Line 9 | 640 | 370 |
|  | Line 17 | 130 | 360 |
| 26 | Line 11 | 775 | 480 |
|  | Line 17 | 360 | 480 |
| 27 | Line 12 | 775 | 615 |
|  | Line 30 | 530 | 675 |
| 31 | Line 9 | 370 | 100 |
| 32 | Line 11 | 480 | 270 |
| 6 Charge heater: | | | |
|  | Line 30 | 675 | |
|  | Line 7 | | 750 |

Tables II and III below indicate the stream compositions on a mole balance scale for the various streams passing between the various zones.

TABLE II.—STREAM MOLE BALANCE

| Line | 38 | 39 | 29 | 30 | 7 | 8 | 10 | 9 | 35 |
|---|---|---|---|---|---|---|---|---|---|
| Component moles: | | | | | | | | | |
| H₂O | | 6.0 | | 6.0 | | 6.0 | 6.0 | 6.0 | 850.4 |
| NH₃ | | | | | | | 23.3 | 23.3 | |
| N₂ | | | | | | | | | |
| H₂S | | 1.9 | | 1.9 | | 1.9 | 230.2 | 11.4 | 218.8 |
| H₂ | 3,562.6 | 1,282.9 | 4,803.6 | | 4,803.6 | 3,787.6 | 147.4 | 3,639.3 | |
| C₁ | 1,707.1 | 154.1 | 1,861.2 | | 1,861.2 | 1,872.8 | 76.2 | 1,796.6 | |
| C₂ | 663.4 | 131.2 | 794.6 | | 794.6 | 807.0 | 69.4 | 737.6 | |
| C₃ | 288.3 | 99.3 | 387.6 | | 387.6 | 399.2 | 36.6 | 362.7 | |
| iC₄ | 33.6 | 17.3 | 51.0 | | 51.0 | 57.4 | 6.2 | 51.2 | |
| nC₄ | 34.6 | 25.3 | 59.9 | | 59.9 | 65.5 | 7.1 | 58.4 | |
| iC₅ | 9.0 | 10.0 | 19.0 | | 19.0 | 24.8 | 3.2 | 21.6 | |
| nC₅ | 5.2 | 5.6 | 10.7 | | 10.8 | 16.5 | 2.2 | 14.3 | |
| muC₆+¹ | 0.6 | 7.3 | 7.8 | | 7.8 | 7.8 | 1.4 | 6.5 | |
| VGO² | | | | 1,267.9 | 1,267.9 | 1,155.3 | 996.0 | 159.3 | |
| Total | 6,720.4 | 1,733.0 | 8,003.4 | 1,267.9 | 9,280.3 | 8,472.3 | 1,364.0 | 7,108.0 | 850.4 |
| Lb./hr | 72,639 | 17,752 | 90,120 | 465,890 | 556,011 | 556,011 | 405,033 | 150,976 | 15,320 |
| M.w | 11.5 | 10.2 | 11.3 | 364.9 | 59.9 | 65.6 | 29.7 | 21.2 | 18.0 |
| B.p.s.d | | | | 35,000 | | | 31,895 | | 1,050 |
| °API | | | | 23.6 | | | | 31.1 | 10 |
| MM SCFD | 57.1 | 15.8 | 72.9 | | | | | 64.7 | |

¹ Vacuum gas oil.
² C₆+ material in make-up gas.

TABLE III.—STREAM MOLE BALANCE

| Line | 36+37 | 15 | 14 | 12 | 11 | 17 | 16 | 13 |
|---|---|---|---|---|---|---|---|---|
| Components, moles: | | | | | | | | |
| H₂O | 850.2 | | 6.2 | | | | | |
| NH₃ | 23.3 | | | | | | | |
| N₂ | | | | | | | | |
| H₂S | | 24.6 | 194.2 | 1.3 | 10.1 | 6.3 | 28.4 | 6.7 |
| H₂ | | 15.0 | 3624.3 | 13.1 | 134.3 | 1.1 | 148.2 | 14.2 |
| C₁ | | 39.2 | 1757.4 | 6.9 | 69.3 | 4.5 | 104.0 | 11.4 |
| C₂ | | 54.7 | 683.0 | 13.5 | 55.9 | 15.6 | 95.0 | 29.1 |
| C₃ | | 65.9 | 296.8 | 7.9 | 28.6 | 29.8 | 64.8 | 37.7 |
| iC₄ | | 16.5 | 34.6 | 1.6 | 4.6 | 10.7 | 10.4 | 12.3 |
| nC₄ | | 22.8 | 35.6 | 1.9 | 5.3 | 16.1 | 11.9 | 18.0 |
| iC₅ | | 12.4 | 9.2 | 1.0 | 2.2 | 11.0 | 3.6 | 12.0 |
| nC₅ | | 9.0 | 5.3 | 0.7 | 1.5 | 8.3 | 2.2 | 9.0 |
| muC₆ | | 5.9 | 0.6 | 0.5 | 0.8 | 6.4 | 0.3 | 7.0 |
| VGO¹ | | 159.3 | | 953.4 | 42.6 | 201.9 | | 1,155.3 |
| Total | 873.4 | 437.7 | 6647.3 | 1006.3 | 357.7 | 326.6 | 468.8 | 1332.9 |
| Lb./hr | 15,376 | 69,509 | 81,051 | 383,664 | 21,369 | 80,480 | 10,397 | 464,144 |
| M.w | 18.0 | 158.8 | 12.2 | 381.3 | 59.7 | 246.4 | 22.2 | 348.2 |
| B.p.s.d | 1,080 | 6,015 | | 29,645 | | 6,520 | | 36,165 |
| °API | 10 | 47.2 | | 28.0 | | 35.7 | | 29.3 |
| MM SCFD | | | 60.5 | | 3.3 | | 4.3 | |

¹ Vacuum gas oil.
² C₆+ material in make-up gas.

I claim as my invention:

1. A method for the separation of a high pressure and temperature effluent stream from a hydrocarbon conversion process into product streams and the removal of heat from said effluent, which process comprises:
   (a) passing said high pressure and temperature effluent into a hot high pressure separator at hot separation conditions including a pressure and temperature substantially the same as said effluent, to effect the separation of said effluent into a hot separator liquid and a hot separator vapor, said vapor and liquid having a pressure and temperature substantially the same said effluent;
   (b) passing said hot separator liquid into a hot flash zone at conditions including a reduction in pressure to effect the separation of said hot separator liquid into a hot flash vapor and a hot flash liquid, said hot flash vapor and liquid having a temperature substantially the same as said effluent;
   (c) cooling said hot flash liquid;
   (d) cooling said hot flash vapor;
   (e) cooling said hot separator vapor and passing said vapor to a cold high pressure separator at conditions to effect the separation of said vapor into a cold high pressure separator vapor and liquid at pressures substantially the same as the effluent pressure;
   (f) recovering said cold high pressure separator vapor;
   (g) reducing the pressure of the cold high pressure separator liquid and passing it together with said hot flash vapor which has been cooled into a cold flash zone at conditions to effect the separation of said cold high pressure separator liquid and said hot flash vapor into fuel gas and cold flash liquid;
   (h) recovering said fuel gas;
   (i) heating said cold flash liquid and commingling said liquid with said hot flash liquid which has been cooled and passing the commingled mixture to a fractionation zone to effect recovery of valuable hydrocarbon components.

2. The method of claim 1 in that said effluent stream comprises converted vacuum gas oil from a hydrodesulfurization and hydrodenitrogenation conversion process.

3. The method of claim 1 in that said effluent stream contains components having average molecular weights of from about 2 up to about 600.

4. The method of claim 1 in that said effluent is at a temperature above about 700° F. and a pressure above about 800 p.s.i.g.

5. The method of claim 1 in that said hot flash conditions include a pressure of less than about 400 p.s.i.g.

6. The method of claim 1 in that said hot flash liquid is cooled from a temperature above about 700° F. to a temperature above about 500° F.

7. The method of claim 1 in that said hot flash vapor is cooled to a temperature below about 300° F.

8. The method of claim 1 in that said hot separator vapor is cooled to a temperature below about 250° F.

9. The method of claim 1 in that said cold flash liquid is heated to a temperature above about 300° F.

10. A method for the separation of a hydrocarbon effluent stream containing components ranging from hydrogen up to 1050° F. end point hydrocarbons from a hydrocarbon conversion process into product streams and the removal and recovery of heat from said components, which process comprises:
   (a) passing said effluent having a temperature above about 600° F. and below about 1500° F. and a pressure above about 600 p.s.i.g. and below about 3000 p.s.i.g. into a hot high pressure separator at hot separation conditions including a temperature within about 50° F. of said effluent and a pressure within about 50 p.s.i.g. of said effluent to effect the separation of said effluent into a hot separator liquid and a hot separator vapor;
   (b) passing said hot separator liquid into a hot flash zone at conditions including a pressure below about 300 p.s.i.g. and a temperature within about 50° F. of said effluent to effect the separation of said liquid into a hot flash vapor containing hydrocarbons having from one up to about six carbon atoms per molecule and a hot flash liquid comprising hydrocarbons boiling above about 600° F.;
   (c) cooling said hot flash liquid by heat exchange with a feed stream which passes to said conversion process;
   (d) cooling said hot flash vapor by heat exchange with a hereinafter defined cold flash liquid;
   (e) cooling said hot separator vapor by heat exchange with a hydrogen containing gas stream passing to said conversion process and heat exchange with a hereinafter defined cold flash liquid;
   (f) passing said hot separator vapor cooled by heat exchange to a cold high pressure separator at conditions including a pressure within 100 p.s.i.g. of said effluent to effect the separation of said cooled vapor into a cold separator liquid comprising hydrocarbons having from one carbon atom per molecule up to hydrocarbons boiling above about 600° F., and a cold separator vapor comprising hydrocarbons having from one to about six carbon atoms per molecule;
   (g) recovering said cold separator vapor;
   (h) passing said hot flash vapor which has been cooled, together with said cold separator liquid to a cold flash zone at conditions including a pressure within about 150 p.s.i.g. of said hot flash zone to effect their separation into a cold flash liquid comprising hydrocarbons boiling above about 600° F. and a cold flash vapor comprising hydrocarbons having from one to about six carbon atoms per molecule;

(i) recovering said cold flash vapor; and (j) heating said cold flash liquid by heat exchange with the aforementioned hot flash vapor and hot separator vapor.

11. The method of claim 10 in that said cold high pressure separator is operated at a temperature below about 150° F.

12. The method of claim 10 in that said cold flash zone is operated at a temperature below about 180° F.

13. The method of claim 10 in that said effluent temperature is within the range of from about 700° F. to about 900° F.

14. The method of claim 13 in that said effluent pressure is within the range of from about 900 p.s.i.g. to about 2000 p.s.i.g.

References Cited
UNITED STATES PATENTS

| | | | |
|---|---|---|---|
| 3,471,397 | 10/1969 | Fortman | 208—209 |
| 3,471,398 | 10/1969 | Borst, Jr. | 208—209 |
| 3,475,324 | 10/1969 | Borst, Jr. | 208—213 |
| 3,481,860 | 12/1969 | Borst, Jr. | 208—213 |
| 3,489,674 | 1/1970 | Borst, Jr. | 208—213 |

DELBERT E. GANTZ, Primary Examiner

G. J. CRASANAKIS, Assistant Examiner

U.S. Cl. X.R.

208—143, 254 H, 352, 108